United States Patent
Matthews

[19]

[11] Patent Number: 6,110,565
[45] Date of Patent: *Aug. 29, 2000

[54] HEAT BOND SEAMING TAPE AND METHOD OF MANUFACTURE

[76] Inventor: James A. Matthews, 1621-36th St. NE., Canton, Ohio 44714

[*] Notice: This patent is subject to a terminal disclaimer.

[21] Appl. No.: 09/067,591

[22] Filed: Apr. 27, 1998

[51] Int. Cl.⁷ ........................................ C09J 7/02
[52] U.S. Cl. .................... 428/156; 428/189; 428/196; 428/200; 428/354; 428/349; 156/244.24; 156/244.25; 156/244.27; 442/150
[58] Field of Search ................... 428/349, 354, 428/156, 189, 196, 200; 442/150; 156/244.24, 244.25, 244.27

[56] References Cited

U.S. PATENT DOCUMENTS

| | | | |
|---|---|---|---|
| 3,877,959 | 4/1975 | Weiss | 427/172 |
| 3,972,768 | 8/1976 | Hill | 156/545 |
| 4,234,649 | 11/1980 | Ward | 428/255 |
| 4,416,713 | 11/1983 | Brooks | 156/64 |
| 4,483,896 | 11/1984 | Gray et al. | 428/200 |
| 4,565,728 | 1/1986 | Gray et al. | 428/200 |
| 4,610,906 | 9/1986 | Brooks | 428/102 |
| 4,749,433 | 6/1988 | Johnston et al. | 156/304.4 |
| 4,824,498 | 4/1989 | Goodwin et al. | 156/71 |
| 4,919,743 | 4/1990 | Johnston et al. | 156/304.4 |
| 4,935,280 | 6/1990 | Gangi | 428/102 |
| 5,003,664 | 4/1991 | Wong | 16/6 |
| 5,198,300 | 3/1993 | Matthews et al. | 428/354 |
| 5,691,051 | 11/1997 | Matthews | 428/354 |

FOREIGN PATENT DOCUMENTS 1282418  11/1968  United Kingdom .

*Primary Examiner*—Jenna Davis
*Attorney, Agent, or Firm*—Sand & Sebolt

[57] ABSTRACT

A heat bond seaming tape has a base formed of a sheet of paper or a paper-like material and an overlying strip of an open mesh material. A plurality of transversely spaced, longitudinally extending beads of a hot melt thermoplastic adhesive material is placed on a top surface of the mesh for adhering the tape to the backs of adjacent carpet edges. A strip of a polyolefin such as a semi-rigid high density polyethylene material is sandwiched between the base sheet and the strip of open mesh material and extends longitudinally along the center of the strip and extends transversely across the carpet seam to prevent seam buckling. The base sheet and reinforcing strip can be extruded as an integral one piece member of the high density polyethylene prior to being joined with the mesh and hot melt adhesive.

28 Claims, 3 Drawing Sheets

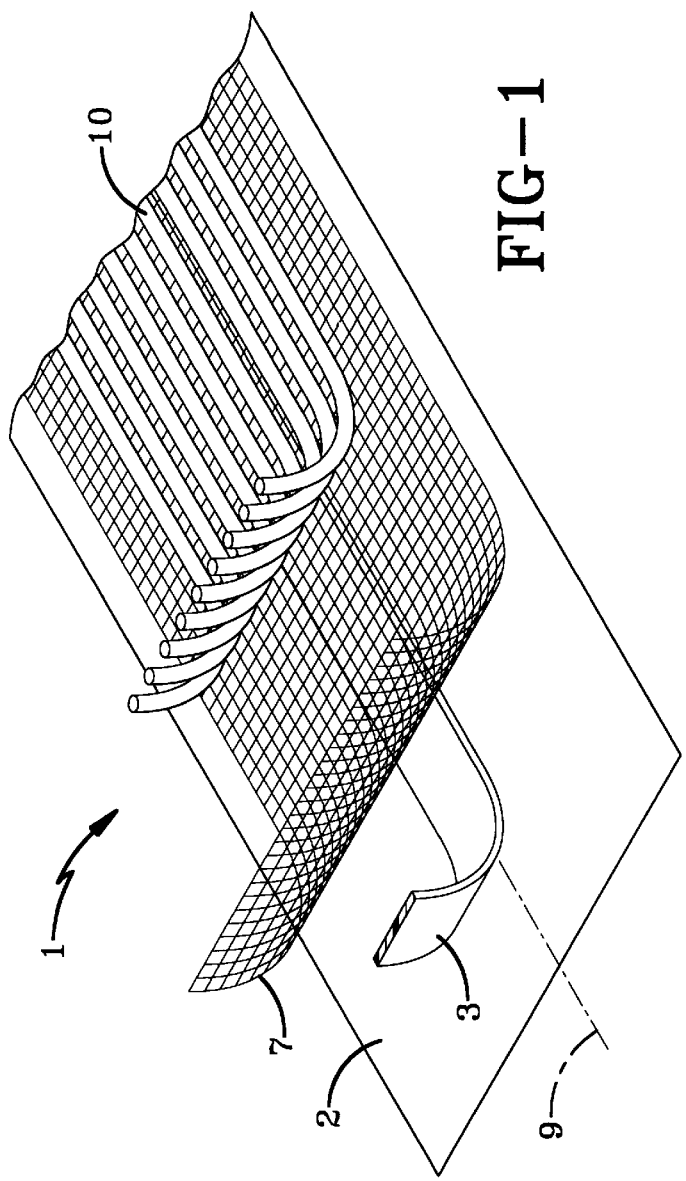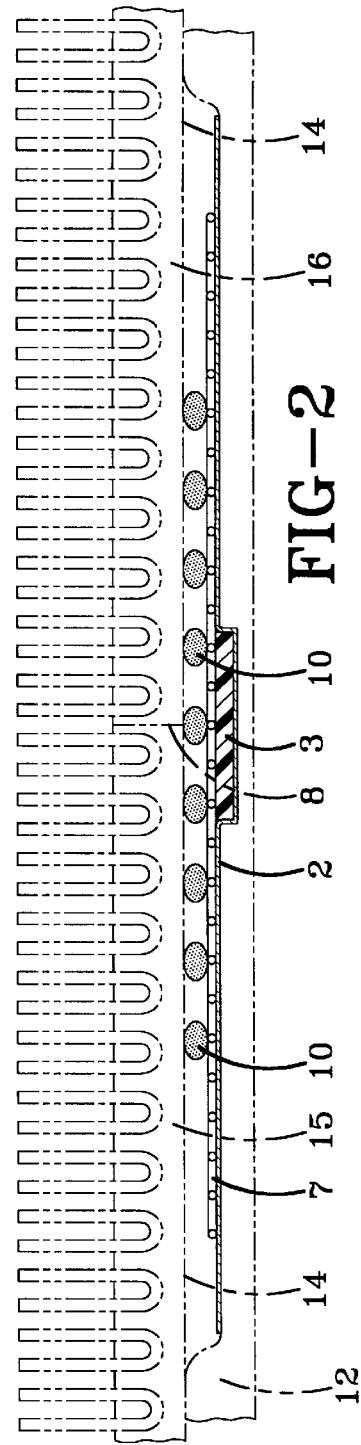

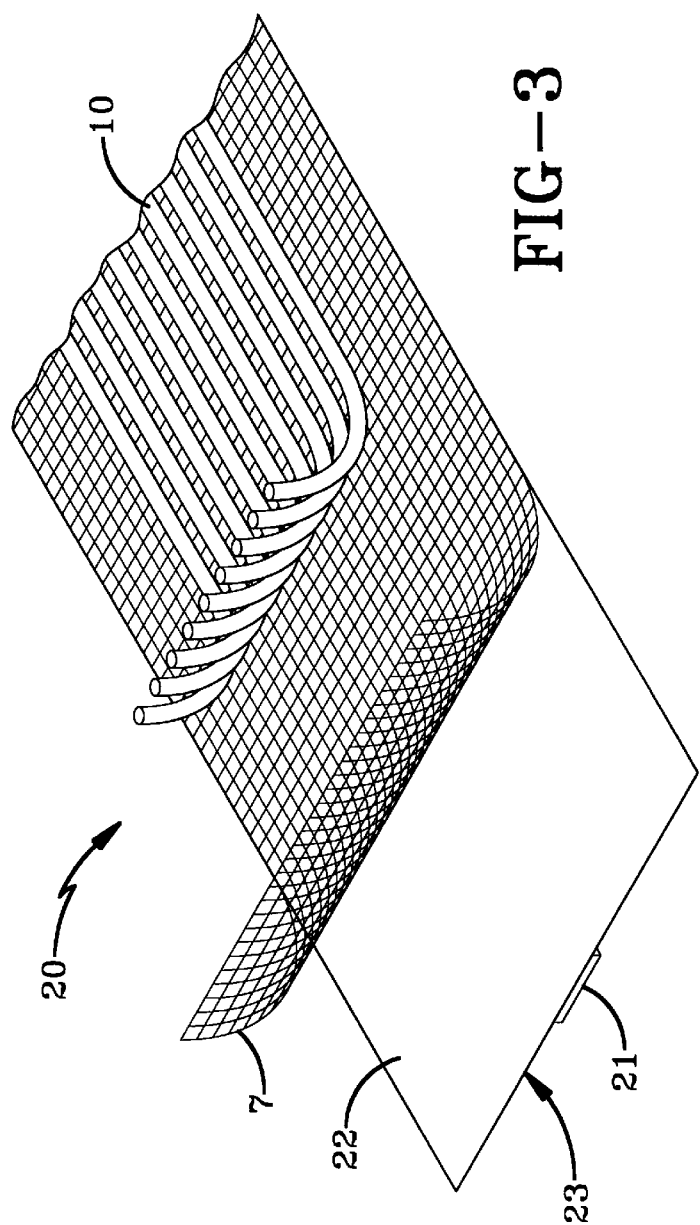
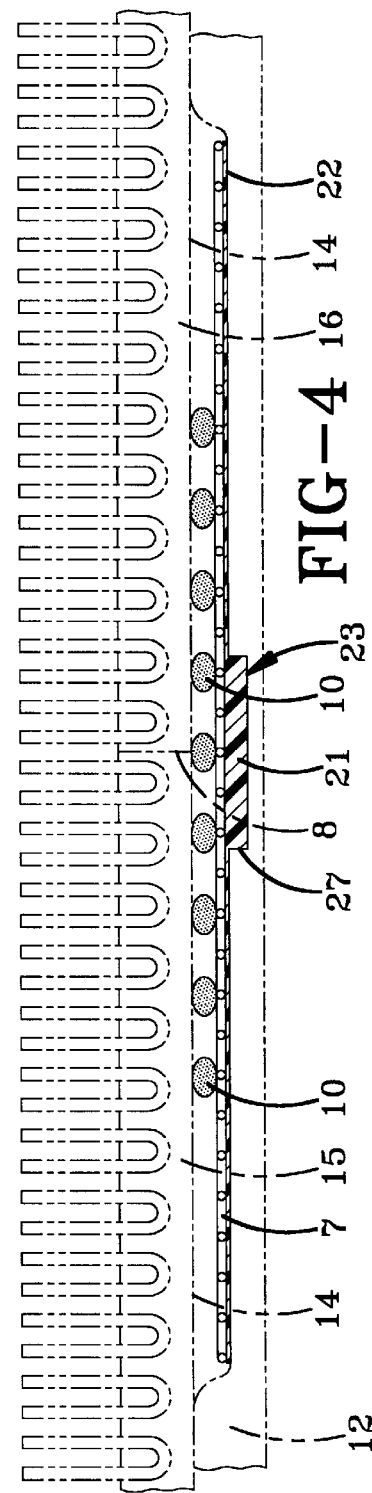

HEAT BOND SEAMING TAPE AND METHOD OF MANUFACTURE

BACKGROUND OF THE INVENTION

1. Technical Field

This invention relates generally to seam tape, and more specifically relates to a seam tape having a longitudinally extending semi-rigid brace member formed of a plastic material, such as polyethylene, which reinforces the tape, and, hence, carpet seams, against buckling, and to the method of manufacturing such a seam tape.

2. Background Information

A longstanding problem in the carpet laying service is the tendency of adjoining carpets to rise along the length of their common seam. This unsightly buckling is caused by the stresses appearing at the seam, and is a source of frequent consumer complaints.

The most widely used means for attempting to retain the abutting carpet edges in a flat disposition is the well known heat bond seam tape. The tape is a composite structure of three primary elements. Essentially, an open mesh reinforcing means, or webbing, is held in sandwiched relation between a strip of paper and a strip of thermoplastic adhesive. The purpose of the tape is to secure the seam, i.e., to prevent the seam from separating responsive to oppositely directed stretching forces imparted to the abutting carpets. It is the weakness of the open mesh, or webbing, which allows the carpets to buckle, or lift, at the seam.

Another drawback of prior art hot melt seaming tape is the tendency for the webbing to separate from the paper upon which it is adhesively mounted when the heat seaming iron is used to melt the layer of thermoplastic adhesive. This phenomenon, known in the trade as web drag, severely weakens the tape and contributes to the lifting of the adjoining carpets at the seam.

One type of seam tape of the prior art is known as pin tape, and includes a plurality of metallic bracing members disposed in sandwiched relation to the paper base and the webbing. The braces have upstanding teeth with which to grab the carpet backing.

U.S. Pat. No. 4,935,280 discloses another prior art seaming tape having reinforcing filaments of high-strength yarn such as fiberglass, synthetic fibers or metal wire woven into the mesh backing of the tape. U.S. Pat. No. 4,565,728 discloses another type of seaming tape having metal wires embedded therein for heating in order to melt the adjacent adhesive, as well as reinforcing cords of fiberglass or the like. U.S. Pat. No. 4,416,713 shows another prior art carpet seaming tape which includes reinforcing filaments formed of rayon or glass fibers which extend transversely across the width of the tapes.

Although prior art carpet seaming tapes such as those discussed above all contain reinforcements, they are in fiber form. Although such fibers may provide reinforcing to the mesh, it does not provide the required reinforcement to prevent buckling or uplifting of the carpet edges at a seam.

U.S. Pat. No. 5,198,300 eliminates many of the problems discussed above with respect to prior art hot melt seaming tapes by the use of a plurality of longitudinally spaced, transversely extending metal brace members. Although this tape has been found to be satisfactory, it is relatively time consuming and difficult to manufacture, in that the metal brace members were difficult to apply and accurately position on the tape as it was being formed.

U.S. Pat. No. 5,691,051 eliminates many of these problems by providing a rigid strip of plastic acrylic material which reinforces the tape against buckling. However, one problem with this tape is that the plastic strip being formed of an acrylic material is rigid and somewhat brittle and could break easily and also is extremely difficult to form into rolled form for shipment and usage unless the tape is serrated along its length to permit it to be rolled into a roll form.

Another problem with existing seam tape is that the backing sheet which is usually formed of paper or other moisture absorbent material will collect mildew and mold especially when the overlying carpet is cleaned, which may provide a harmful condition to occupants of the house especially those suffering from allergies. Likewise, this paper backed tape is subject to deterioration and break down over time and also provides problems during manufacture since it will tear if an excessive pressure or tension is applied thereto.

Thus, there is a need in the carpet laying service for a seaming tape that provides lift-free seams. Furthermore, a need exists for an improved method in which such a carpet seaming tape can be mass produced relatively inexpensively, without sacrificing the advantages achieved by the tape when used in laying carpet, and which can be easily rolled into a roll form for convenience of storage, shipment and usage.

SUMMARY OF THE INVENTION

The longstanding but heretofore unfulfilled need for such a seaming tape is now provided in the form of a tape having a longitudinally extending strip of a semi-rigid plastic material formed of a polyolefin such as polyethylene or polyproplyne which is placed in juxtaposition to a base sheet and underlying the webbing of the tape, which can be applied in a relatively simple and expedient manufacturing process, enabling the tape to be produced at a reduced cost than heretofore possible with other types of seaming tapes having anti-buckling features.

Therefore, the primary object of this invention to provide a seaming tape that eliminates the lifting of abutting carpets at the seam that occurs during stretching of carpet when prior art seaming tapes are used, and to an improved method of manufacturing such a seaming tape.

Another objective of the invention is to provide such a seaming tape in which the semi-rigid plastic strip of material can be formed as a single continuous strip, and then applied to the base sheet enabling the plastic strip to be rolled together with the other components of the seaming tape into a compact roll for shipment and subsequent use.

A still further objective of the invention is to provide such a seaming tape in which the semi-rigid plastic strip may be formed by extruding the strip simultaneously with the base sheet which is formed of the same semi-rigid plastic material as that of the reinforcing strip, which is then easily applied to the mesh and adhesive in a simple and more expedient manner than heretofore possible wherein the reinforcing strip was a separate component which was the subsequently applied to the base strip which usually was formed of a paper material.

A further object of the invention is to provide such a hot bond seaming tape and method of manufacture in which the semi-rigid plastic strip of material is extruded separately and then applied to the mesh sheet prior to the mesh sheet being coated with the hot melt bonding adhesive.

Another objective of the invention is to provide such a seaming tape in which the semi-rigid integral plastic strip and base sheet combination are formed of a high density polyethylene which provides superior stress crack resistance combined with high impact strength and rigidity, yet provides sufficient strength to prevent separation and peeking of the carpet seam, yet which is flexible enough to permit forming the seaming tape into roll form for ease of shipment, storage and subsequent application to a carpet seam.

Still another objective of the invention is to provide such a seaming tape in which the base sheet being formed of a plastic material, prevents the collection of moisture and the subsequent formation of mildew and other harmful bacteria, thereby providing a more environmentally friendly tape than the heretofore paper backed seam tapes.

These objectives and advantages are obtained by the improved seaming tape of the invention which is used for connecting and joining edges of carpet at a seam, the general nature of which may be stated as including an elongated base sheet of flexible material; a semi-rigid strip of plastic material formed of a polyolefin extending longitudinally along the base sheet; an elongated strip of open mesh material extending along the base sheet in an overlying relationship to said semi-rigid strip of plastic material; and a thermoplastic adhesive material applied to and overlying the mesh material for bonding said mesh material and the semi-rigid plastic strip to a backing of the carpet.

These objectives and advantages are further obtained by the improved method of forming a seam tape for connecting adjoining edges of carpet to reduce buckling, wherein the general nature of said method includes the steps of extruding a base sheet of a semi-rigid plastic material having a thickened central portion which extends longitudinally throughout the length of the base sheet; applying an elongated strip of open mesh material along the base sheet in overlying relationship to the thickened central portion; and applying a thermoplastic hot melt adhesive to the mesh material in overlying relationship to the mesh material to form an elongated strip of the seam tape.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a fragmentary perspective view showing a first embodiment of the seaming tape of the present invention with the individual layers thereof being peeled back to expose the underlying layers of material;

FIG. 2 is a fragmentary sectional view showing the improved seaming tape of FIG. 1 placed along the seam of two adjacent sections of carpet shown in dot-dash lines and located above a carpet pad; and FIG. 3 is a view similar to FIG. 1 of a second embodiment of the heat bond seaming tape;

FIG. 4 is an enlarged fragmentary sectional view similar to FIG. 2 showing the seaming tape of FIG. 3 placed between a carpet pad and carpet along the seam of two adjacent carpet sections;

Similar numerals refer to similar parts throughout the drawings.

DESCRIPTION OF THE PREFERRED EMBODIMENTS

Figure 5:
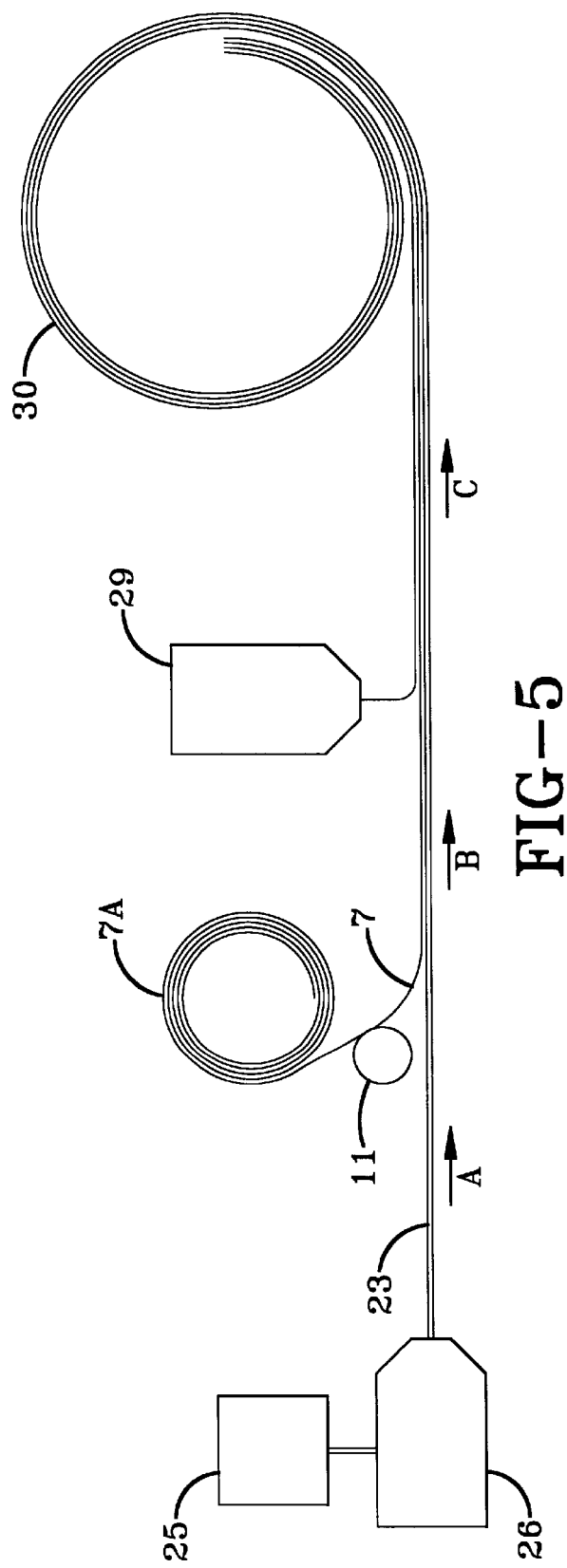
FIG. 5 is a diagrammatic view showing the sequence of steps of the method of the present invention for forming the improved heat bond seaming tape of FIGS. 3 and 4.

A first embodiment of the improved heat bond seaming tape is indicated generally at 1, and is shown in FIGS. 1 and 2 in a fragmentary perspective condition, with the individual components being pulled back to show the underlying components.

As in conventional heat bond seaming tape, a base sheet 2 is provided, which is formed of an elongated flexible material, such as crepe paper or various types of lightweight paper, or could be formed of other materials, such as cloth or the like, which currently is used for many seaming tape constructions. In the preferred embodiment, base sheet 2 will have a width of approximately 2½ to 7 inches.

In accordance with one of the main features of the invention, a reinforcing strip of a semi-rigid plastic material, indicated generally at 3, is placed on base strip 2 and extends longitudinally therealong, preferably along the centerline of sheet 2. Reinforcing strip 3 is formed as a single continuous strip, preferably by an extrusion process, the important characteristics of which are discussed below.

Seam tape 1 further includes a strip of open mesh webbing, indicated at 7, which extends longitudinally along base sheet 2 and overlies plastic strip 3. Mesh strip 7 is of a usual construction formed of fiberglass, nylon, polyester or other types of synthetic fibers well known for the construction of such mesh for use in the carpet seaming art. Examples of such mesh material are shown in U.S. Pat. Nos. 5,198,300, 3,877,959, and 4,565,728. In the preferred embodiment, mesh 7 will have a transverse width of approximately three to four inches. Mesh 7 preferably is coated with a usual latex adhesive or glue securing it to base strip 2.

Just as in conventional seaming tapes, it is the function of webbing 7 to keep the carpet seam 8 (FIG. 2) from separating when the carpet is stretched. Although such webbing in conventional types of seaming tape usually performs its intended function, it does so at the cost of peaking or lifting at the seams when the carpet is stretched that is often apparent when conventional tapes are used. Such buckling occurs because the webbing is flexible and responds to lateral-directed forces, such forces being generated by carpet stretching, causing buckling along its longitudinal axis of symmetry.

A plurality of elongated beads 10 of a thermal setting hot-melt thermoplastic adhesive are placed in a transversely spaced relationship and extend longitudinally in a spaced parallel relationship along mesh 7. Thermoplastic beads 10 can be formed of various hot-melt adhesives well known in the carpet seaming art, an example of which is set forth in U.S. Pat. No. 4,416,713. Adhesive 10 at usual ambient temperatures is non-liquid, yet liquefies upon the application of a low amount of heat, such as that generated by a carpet seaming iron or tool for bonding the tape to the backing of adjoined carpets without affecting plastic strip 3. Although adhesive 10 is shown as being applied in individually spaced beads, it is readily understood that adhesive 10 could be a continuous sheet of adhesive extending along mesh strip 7 or a combination of sheets and beads.

A protective strip (not shown) of a flexible material having an adhesive-release coating applied to its underside surface may be placed over and in contact with adhesive 10 to protect the adhesive and prevent it from bonding to itself when placed in a roll form. However, since adhesive 10 is solid at ambient temperatures, such a cover sheet will not be used for most applications. The protective strip is easily peeled away from adhesive 10 just prior to placing tape 1 across a carpet seam.

In the preferred embodiment, plastic strip 3 will have a transverse width of between one-fourth and two inches so as to provide sufficient area on both sides of carpet seam 8 when tape 1 is secured thereto, to prevent buckling as shown in FIG. 2, with the preferred width being five-eighths inch Strip 3 preferably has a thickness range of between 8 mils and 100 mils, with the preferred thickness being 50 mils. This thickness has been found to provide sufficient strength to the carpet seam to prevent buckling or carpet uplift, but not substantially increasing the thickness at the seam area to provide an unsightly appearance to the carpet installation. Most importantly, it ensures that the strip has sufficient flexibility enabling it to be rolled easily into a roll form without the danger of cracking as can occur with a more brittle plastic such as acrylic.

In accordance with one of the main features of the invention, strip 3 is formed of polyolefin which has sufficient flexibility to enable the finished tape to be rolled into a roll form, yet sufficient strength to prevent the strip from cracking or breaking during manufacture and usage. The preferred material is a medium molecular weight distribution high density polyethylene copolymer having the particular features set forth below. This enables the strip to have superior stress crack resistance combined with high impact strength and rigidity. The particular characteristics of the preferred embodiment are set forth in the following table.

| PROPERTY | ASTM TEST | NOMINAL VALUE |
| --- | --- | --- |
| Resin Properties | | |
| Melt Flow g/10 min | D-1238-89 | 0.3 |
| Density g/cc | D-1505-85 | 0.950 |
| Mechanical Properties | | |
| Tensile, psi | D-638-89 | 3,700 |
| M Pa | | 25 |
| Elongation % | D-638-89 | >800 |
| Tensile Modulus, psi | D-638-89 | 120,000 |
| M Pa | | 830 |
| Flexural Stiffness, psi | D-747-86 | 115,000 |
| M Pa | | 790 |
| Tensile impact ft lbs/in2 | D-1822-89 | 120 |
| Impact Brittleness Temp. ° F. | D-746-79 | <105 |
| ° C. | | <76 |
| Environmental stress crack resistance | D1693-86 | 30 hrs |
| Hardness, Shore D | D-2240-86 | 68 |
| Thermal Properties | | |
| Vicat softening Temp ° F. | D-1525-87 | 254 |
| ° C. | | 123 |
| Heat Deflection Temp | D-648-82 | |
| ° F. at 66 psi | | 157 |
| ° C. at 4.64 kg/cm$^2$ | | 70 |
| Coefficient of linear thermal expansion | D-696-79 | |
| in/in/° F. | | 7 × 10$^5$ |
| cm/cm/° C. | | 1.2 × 10$^4$ |
| Bulk Density lbs/ft$^3$ | D-1895-89 | 37 |
| kg/m$^3$ | | 590 |

The above is merely one example of the type of material which can be used for strip 3. There are other grades of polyethylene or polyproplyne which can be used to achieve the desired objectives well known to those skilled in the art. For example, the material can have a density generally within the range of 0.85 to 1.0 g/cc; an elongation percent generally within the range of from 15 to 1000; a tensile impact measured in ft lbs/in$^2$ generally within the range of between 10 and 140; a Shore D hardness generally within the range of 40 to 100; a Vicat softening temp. F generally within the range of between 240 to 270; a heat deflection temperature in ° F. at 66 psi generally within the range of between 140 and 200; and a bulk density in lbs/ft$^3$ generally between 20 and 60.

As in conventional tapes, the novel tape of the present invention is placed in underlying relationship to a seam 8 to be formed between sections of carpet 15 and 16, as shown in FIG. 2, with its longitudinal axis of symmetry 9 lying in substantial registration with carpet seam 8 so that the stresses appearing at the seam will be evenly distributed throughout tape 1. In many installations, tape 1 will be placed between the carpet and a bottom resilient pad 12. A usual heat seaming iron (not shown) may be employed to melt thermoplastic adhesive 10 in a conventional manner so that a bond can be established between the adhesive and backing 14 of abutting carpets 15 and 16, so that when adhesive 10 rehardens, the abutting carpet edges will bond with the adhesive and, hence, with each other. The applied heat is insufficient to affect the stability of plastic strip 3. Plastic strip 3 successfully resist peaking at the seams, even when the seam is subjected to substantial stressing, and maintains the structural integrity of tape 1.

A second embodiment of the invention is shown in FIGS. 3 and 4, and is indicated generally at 20. Tape 20 is similar to tape 1 discussed above in that it includes a mesh strip 7 and thermal adhesive 10. However, a thickened semi-rigid strip 21, which is similar to strip 3 discussed above, is formed integrally with a base sheet 22, preferably by an extrusion process as described further below and shown in FIG. 5, to form an integral one piece base member indicated generally at 23, to which mesh 7 and thermal adhesive 10 is applied as discussed above. In the preferred embodiment base sheet 22 will have a thickness of one mil with strip 21 having a thickness of approximately 50 mils. However, these could range from strip 22 having a thickness of between one mil and 50 mils with strip 21 having the similar range of thickness as discussed above between 8 mils and 100 mils. Base sheet 22 is formed of polyolefin and in the preferred embodiment will be the same high density polyethylene as discussed above which enables sheet 23 and strip 21 to have the desired semi-rigid characteristic enabling it to be easily rolled into roll form for ease of storage and shipment, yet sufficient strength to prevent seam peaking and prevent breaking when in place beneath the overlying carpet as occurs if an acrylic is used.

Preferably base sheet 22 will have the same width as mesh 7 so that the heat of the heating iron will not melt any exposed edges of sheet 22 by direct contact therewith.

In further accordance with the invention, seaming tape 20 can be produced more easily and at less expense than known heat bond seaming tape. The particular method of the present invention for forming tape 20 is shown diagrammatically in FIG. 5.

A container 25 of the polyolefin or high density polyethylene described above, supplies the plastic material to a usual extruder 26 which extrudes base sheet 23 which will move in the direction of arrow A. Mesh 7 is applied from a roll 7A thereof onto the top of strip 23 before passing the partially formed tape through an adhesive application zone 29 which applies the individual beads 10 of the liquid thermoplastic material onto mesh 7. Preferably, mesh 7 passes over a roll 11 which applies a thin layer of a latex adhesive to mesh 7 to assist it to remain secured to base sheet 2. In the alternative, the latex adhesive may be applied directly to surface 17 of sheet 23. If desired, the partially fabricated tape then may pass through a cooling station (not shown) to completely solidify thermoplastic adhesive 10 and strip 23. The assembled tape, which will include all of the components as shown in FIG. 3, then will continue to move in the direction of arrows C, where it is then rolled easily into a final configured roll, indicated generally at 30, for ease of storage and shipment due to the semi-rigid characteristic of the plastic material.

In summary, tapes 1 and 20 include a reinforcing strip of semi-rigid polyethylene plastic material 3 or a single base sheet 23, respectively, formed of the same high density polyethylene as strip 3, which plastic material has a higher thermal melting point than that of the thermoplastic hot melt adhesive 10, thereby providing an inexpensive easily constructed seam tape which prevents buckling of the carpet seam without materially increasing the thickness of the seam. This particular plastic material provides sufficient stiffness to the carpet seam yet enables the tape to be formed into a roll form due to the flexibility of the particular polyethylene plastic material used to form the reinforcing strip, and which is less susceptible to breaking and cracking. Furthermore, the plastic material of tape 20 will not absorb moisture as do the prior art paper backed seaming tape thereby preventing the formation of mold and mildew with the resultant possible harmful effect to the building occupants especially those suffering from allergies. Likewise, the plastic material has an indefinite life span and will not degrade over time as can occur with certain paper backed tape.

Likewise, it is easy to extrude the base sheet of tape 20 in various sizes and thickness relatively easy by adjusting the extrusion die without materially changing the manufacturing process. This makes it competitive with paper backed tapes and enables a wide range of tapes to be easily and economically produced depending upon the particular application and quality of the tape desired by the tape supplier and carpet installer.

Figure 6:
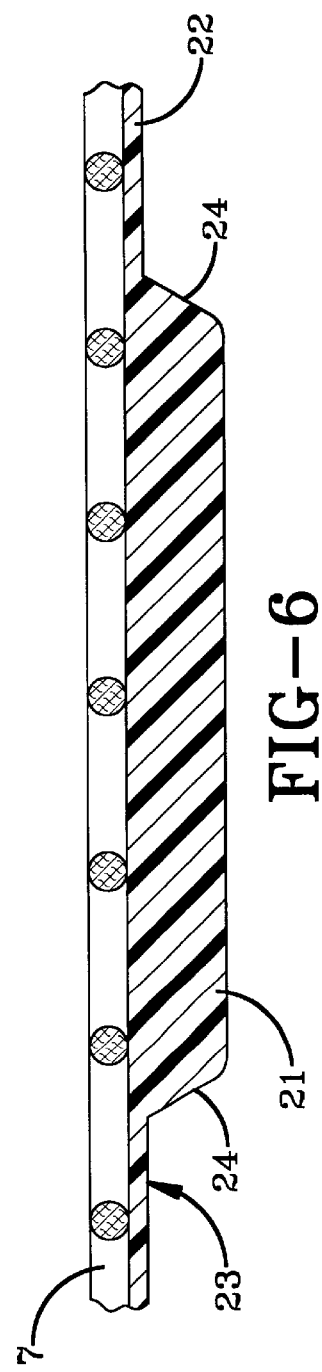
FIG. 6 is a greatly enlarged fragmentary sectional view of a slightly modified central section of the seaming tape of FIG. 4.

FIG. 6 is a greatly enlarged fragmentary sectional view of the central portion of FIG. 4 showing a slightly modified configuration of strip 23 wherein the thickened central portion 21 merges into base sheet 22 with sloped sides 24 instead of the straight configuration of sides 27 of strip 3.

Likewise, if desired, strip 21 and sheet 22 could be extruded separately and then joined by any suitable adhesive in forming strip 23 instead of extruding it in a single process without affecting the concept of the invention. Likewise, although a particular type of polyethylene having the characteristics set forth above is the preferred material to be used for strip 3 and 21 and base sheet 22, other types of polyolefin could be used, such as polypropylene so long as the material has sufficient flexibility to enable it to be rolled into a roll form yet withstand the pressures exerted thereon when in use beneath a carpet in contrast to the heretofore used more brittle acrylic plastic of the prior art seaming tape of which the present invention is an improvement thereon.

As an example a 50 ft. length of tape 1 can be easily rolled into roll form having a radius of from 4 inches to 12 inches depending upon the particular thickness of strip 3 or sheet 23.

It will thus be seen that the objects set forth above and those made apparent by their preceding description are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Accordingly, the improved carpet seaming tape is simplified, provides an effective, safe, inexpensive, and efficient tape which achieves all the enumerated objectives, provides for eliminating difficulties encountered with prior tapes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved carpet seaming tape is constructed and used, the characteristics of the construction, and the advantageous, new and useful results obtained; the new and useful structures, devices, elements, arrangements, parts and combinations, and method steps are set forth in the appended claims.

What is claimed is:

1. A seam tape for connecting adjoining edges of carpet at a seam thereof to reduce buckling of said edges along said seam, said tape including:

an elongated base sheet of flexible material;

a semi-rigid continuous strip of plastic material formed of polyolefin extending continuously longitudinally along the base sheet;

an elongated strip of open mesh material extending along the base sheet in an overlying relationship to said semi-rigid strip of plastic material; and a thermoplastic adhesive material applied to and overlying the mesh material for bonding said mesh material and the semi-rigid plastic strip to a backing of the carpet.

2. The seam tape defined in claim 1 in which the semi-rigid plastic strip has a width substantially less than the width of the base sheet.

3. The seam tape defined in claim 1 in which the semi-rigid plastic strip and base sheet are formed as an integral one piece member.

4. The seam tape defined in claim 1 in which the thermoplastic adhesive material is a plurality of transversely spaced beads of said adhesive material extending in a substantially parallel longitudinal direction with respect to said base sheet.

5. The seam tape defined in claim 1 in which the semi-rigid plastic strip has a transverse width substantially between one-half inch and two inches.

6. The seam tape defined in claim 5 in which the semi-rigid plastic strip has a transverse width of approximately one and one-half inches.

7. The seam tape defined in claim 5 in which the semi-rigid plastic strip has a transverse width of approximately ⅝ inch.

8. The seam tape defined in claim 1 in which the semi-rigid plastic strip has a thickness of substantially between 8 mils and 100 mils.

9. The seam tape defined in claim 8 in which the plastic strip has a thickness of approximately 50 mils.

10. The seam tape defined in claim 1 in which the base sheet and mesh material, each has a transverse width substantially within the range of between two and one-half inches and seven inches, with the width of said mesh material being equal to or smaller than the width of said base sheet.

11. The seam tape defined in claim 1 in which the strip of plastic material is a high density polyethylene.

12. The seam tape defined in claim 11 in which the strip has a density generally within the range of 0.85 to 1.0 g/cc and a tensile impact generally within the range of between 10 to 140 ft lbs/in$^2$.

13. The seam tape defined in claim 12 in which the strip has a density of approximately 0.95 g/cc and a tensile impact of approximately 120 ft lbs/in$^2$.

14. The seam tape defined in claim 11 in which the strip has a Shore D hardness generally within the range of between 40 and 100.

15. The seam tape defined in claim 14 in which the strip has a Shore D hardness of approximately 68.

16. The seam tape defined in claim 1 in which the base sheet is formed of a polyolefin.

17. The seam tape defined in claim 16 in which the base sheet is formed of a polyethylene.

18. A seam tape for connecting adjoining edges of carpet at a seam thereof to reduce buckling of said edges along said seam, said tape including:
    an elongated base sheet formed of a semi-rigid strip of polyolefin having a thickened reinforcing strip formed of a similar material extending longitudinally along said base sheet substantially in the center thereof;
    an elongated strip of open mesh material extending along the base sheet in an overlying relationship to said semi-rigid strip of material; and
    a thermoplastic adhesive material applied to and overlying the mesh material for bonding said mesh material and the semi-rigid strip to a backing of the carpet.

19. The seam tape defined in claim 18 in which the semi-rigid reinforcing strip and base sheet are formed as an integral one piece extruded member.

20. The seam tape defined in claim 19 in which the semi-rigid strip and base sheet is formed of a high density polyethylene material.

21. A method of forming a seam tape for connecting adjoining edges of carpet to reduce buckling, said method including the steps of:
    extruding a base sheet of a semi-rigid plastic material having a thickened central portion;
    applying an elongated strip of open mesh material along the base sheet in overlying relationship to said sheet; and
    applying a thermoplastic hot melt adhesive to the mesh material in overlying relationship to the mesh material to form an elongated strip of the seam tape.

22. The method defined in claim 21 including the step of applying the thermoplastic material in a liquid state on the base sheet as said base sheet is moving past a liquid supply of said thermoplastic material.

23. The method defined in claim 21 including the step of applying an adhesive between the mesh material and base sheet to secure said mesh material to said base sheet.

24. The method defined in claim 22 including the step of rolling the elongated strip of seam tape into a roll after cooling the liquid thermoplastic material.

25. The method defined in claim 21 including the step of forming the base sheet of a high density polyethylene plastic material.

26. The method defined in claim 25 including the step of providing the base sheet with a thickness within the range of between 1 mil and 50 mils and the thickened central portion with a thickness of between 8 mils and 100 mils.

27. The method defined in claim 25 including the step of providing the base sheet with a density of approximately 0.95 g/cc and a tensile strength of approximately 3,700 psi.

28. The method defined in claim 25 including the step of providing the base sheet with a Shore D hardness of approximately 68.

* * * * *